United States Patent
Jang et al.

(10) Patent No.: US 12,099,510 B2
(45) Date of Patent: *Sep. 24, 2024

(54) DYNAMIC VALUATION SYSTEM USING OBJECT RELATIONSHIPS AND COMPOSITE OBJECT DATA

(71) Applicant: Chicago Mercantile Exchange Inc., Chicago, IL (US)

(72) Inventors: Seo Wook Jang, Chicago, IL (US); Jeon Ho Cho, Chicago, IL (US); Bo Miao, Chicago, IL (US); Cham Hong Po, Chicago, IL (US); Yaotian Zhang, Jersey City, NJ (US); Panagiotis Xythalis, Chicago, IL (US); Matthew Morano, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,402

(22) Filed: Jul. 20, 2023

(65) Prior Publication Data

US 2023/0359634 A1 Nov. 9, 2023

Related U.S. Application Data

(63) Continuation of application No. 17/527,372, filed on Nov. 16, 2021, now Pat. No. 11,768,841, which is a
(Continued)

(51) Int. Cl.
*G06F 16/00* (2019.01)
*G06F 16/22* (2019.01)
(Continued)

(52) U.S. Cl.
CPC .... *G06F 16/24578* (2019.01); *G06F 16/2246* (2019.01); *G06Q 40/04* (2013.01)

(58) Field of Classification Search
CPC .......... G06F 16/24578; G06F 16/2246; G06Q 40/04
(Continued)

(56) References Cited

U.S. PATENT DOCUMENTS

| 4,677,552 A | 6/1987 | Sibley, Jr. |
| 4,903,201 A | 2/1990 | Wagner |

(Continued)

FOREIGN PATENT DOCUMENTS

| EP | 0407026 A2 | 1/1991 |
| EP | 0411748 A2 | 2/1991 |

(Continued)

OTHER PUBLICATIONS

CME, "CBOT Corn, Wheat, Rice, Oats, Soybean, Soybean Meal, Soybean Oil and KCBT Wheat Futures Daily Settlement Procedure", Jul. 29, 2013.

(Continued)

*Primary Examiner* — Monica M Pyo
(74) *Attorney, Agent, or Firm* — Lempia Summerfield Katz LLC

(57) ABSTRACT

The disclosed embodiments relate to systems and methods for generating an optimal solution for determining a value for one or more base data objects. A plurality of solutions include one or more composite data objects transacted by a transaction system processor. The composite data objects include the one or more base data objects. An optimal solution is generated by using data indicative of a level of activity and a number of sources for each of the plurality of composite data objects.

20 Claims, 12 Drawing Sheets

Related U.S. Application Data continuation of application No. 17/015,211, filed on Sep. 9, 2020, now Pat. No. 11,210,305, which is a continuation of application No. 15/192,203, filed on Jun. 24, 2016, now Pat. No. 10,803,069.

(51) Int. Cl.
*G06F 16/2457* (2019.01)
*G06Q 40/04* (2012.01)

(58) Field of Classification Search
USPC .......................................................... 707/723
See application file for complete search history.

(56) References Cited

U.S. PATENT DOCUMENTS

| | | | |
|---|---|---|---|
| 4,980,826 A | 12/1990 | Wagner | |
| 5,787,402 A | 7/1998 | Potter et al. | |
| 6,047,274 A | 4/2000 | Johnson et al. | |
| 6,418,419 B1 | 7/2002 | Nieboer et al. | |
| 7,039,610 B2 | 5/2006 | Morano et al. | |
| 7,509,275 B2 | 3/2009 | Glinberg et al. | |
| 7,593,877 B2 | 9/2009 | Glinberg et al. | |
| 7,831,491 B2 | 11/2010 | Newell et al. | |
| 8,156,027 B1 | 4/2012 | Haddad et al. | |
| 10,430,881 B2 * | 10/2019 | Bixby | G06Q 40/04 |
| 10,853,879 B2 * | 12/2020 | Konduru | G06Q 40/04 |
| 11,205,224 B2 * | 12/2021 | Bixby | G06Q 40/04 |
| 11,501,373 B2 * | 11/2022 | Konduru | G06Q 40/04 |
| 2002/0070915 A1 | 6/2002 | Mazza et al. | |
| 2003/0009419 A1 | 1/2003 | Chavez et al. | |
| 2003/0023542 A1 | 1/2003 | Kemp, II et al. | |
| 2003/0041047 A1 | 2/2003 | Chang | |
| 2003/0200167 A1 | 10/2003 | Kemp, II et al. | |
| 2003/0236737 A1 | 12/2003 | Kemp, II et al. | |
| 2003/0236738 A1 | 12/2003 | Lange et al. | |
| 2004/0006529 A1 | 1/2004 | Fung | |
| 2004/0054617 A1 | 3/2004 | Fung | |
| 2004/0064395 A1 | 4/2004 | Mintz et al. | |
| 2004/0093300 A1 | 5/2004 | Burns | |
| 2004/0103054 A1 | 5/2004 | Singer | |
| 2004/0148242 A1 | 7/2004 | Liu | |
| 2004/0153391 A1 | 8/2004 | Burns et al. | |
| 2004/0153392 A1 | 8/2004 | West et al. | |
| 2004/0153393 A1 | 8/2004 | West et al. | |
| 2004/0153394 A1 | 8/2004 | West et al. | |
| 2004/0210514 A1 | 10/2004 | Kemp, II et al. | |
| 2005/0096999 A1 | 5/2005 | Newell et al. | |
| 2008/0065521 A1 | 3/2008 | Horowitz | |
| 2008/0133429 A1 | 6/2008 | Horowitz | |
| 2009/0248588 A1 | 10/2009 | Hadi | |
| 2009/0299812 A1 | 12/2009 | Ray | |
| 2010/0174633 A1 | 7/2010 | Milne | |
| 2011/0313905 A1 | 12/2011 | Siddall et al. | |
| 2012/0123967 A1 | 5/2012 | Glinberg et al. | |
| 2012/0130923 A1 | 5/2012 | Shah | |
| 2013/0018768 A1 | 1/2013 | Sturm et al. | |
| 2013/0054439 A1 | 2/2013 | Zhao et al. | |
| 2013/0073479 A1 | 3/2013 | Koblas et al. | |
| 2013/0132250 A1 | 5/2013 | Fraser et al. | |
| 2014/0100989 A1 | 4/2014 | Zhang et al. | |
| 2014/0317021 A1 | 10/2014 | Weber et al. | |
| 2015/0073962 A1 | 3/2015 | Bixby et al. | |

FOREIGN PATENT DOCUMENTS

| | | |
|---|---|---|
| JP | 2000-353196 | 12/2000 |
| JP | 2001-222591 | 8/2001 |

OTHER PUBLICATIONS

Lu et al., "ODMG Extension of Composite Objects in OODBMS: A Proposal", Paper, 40th International Conference on Technology of Object-Oriented Languages and Systems, Sydney Australia, 2002, 10 pages.

\* cited by examiner

DYNAMIC VALUATION SYSTEM USING OBJECT RELATIONSHIPS AND COMPOSITE OBJECT DATA

CROSS REFERENCE TO RELATED APPLICATIONS

This application is a continuation under 37 C.F.R. § 1.53(b) of U.S. patent application Ser. No. 17/527,372 filed Nov. 16, 2021, now U.S. Pat. No. 11,768,841, which is a continuation under 37 C.F.R. § 1.53(b) of U.S. patent application Ser. No. 17/015,211 filed Sep. 9, 2020, now U.S. Pat. No. 11,210,305, which is a continuation under 37 C.F.R. § 1.53(b) of U.S. patent application Ser. No. 15/192,203 filed Jun. 24, 2016 now U.S. Pat. No. 10,803,069, the entirety of all of which are incorporated by reference herein and relied upon.

BACKGROUND

Computer processing speeds depend in large part on the amount of data being processed and the complexity of the operations and processing being performed on the data. Some computing systems include many, e.g., hundreds or thousands, of objects of differing types, and attempt to compute values for the objects. Some of the objects may be related or based on other objects, and the system environment may impose rules and restrictions on the objects. In a complex environment, values for the objects may be computed using the rules and restrictions using different solutions. Many times the optimal solution for processing the values may be indeterminate. A computer tasked with calculating values and optimizing values based on the rules and restrictions may follow a set of procedures, routines or sub-routines to arrive at the final values. The set of procedures, routines or sub-routines may change over time as the values of the underlying objects change. For computers handling multiple inter-related objects having changing rules and restrictions, it is a challenge to efficiently process and compute final values for the objects. Identifying a specific solution for calculating the final value can decrease redundancy and can increase processing efficiency.

Accordingly, there is a need for systems and methods that can generate and select optimal solutions for calculating values for inter-related objects in an efficient and timely manner, so that the optimized object solutions justify any increase in processing time due to the optimization.

DETAILED DESCRIPTION

Figure 1:
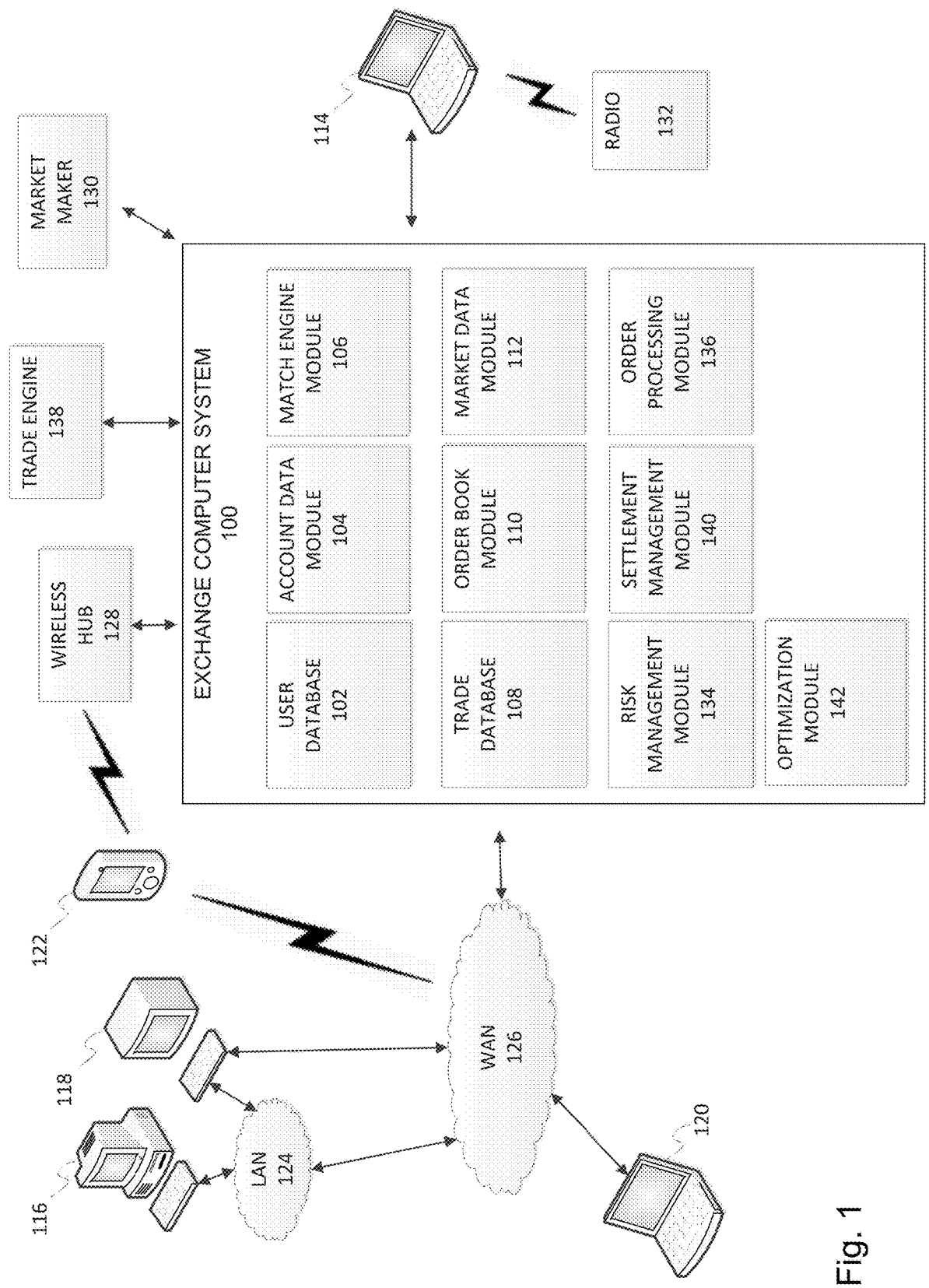
FIG. 1 depicts an illustrative computer network system that may be used to implement aspects of the disclosed embodiments.

The disclosed embodiments relate generally to generating and selecting optimum solutions comprising related composite objects for calculating values for base objects. The value of a base object may be calculated by selecting one or more related composite objects in order to link to a core object that has a known value. The veracity and/or reliability of the value of the related composite objects and core object, as accurately representing the actual value thereof, may be corroborated using external data sources. Specifically, the disclosed embodiments optimize overall system performance by predictably and efficiently determining and selecting solutions from numerous different possible combinations that allow for estimating a value with a high level of confidence as to the accuracy thereof.

Thus, the disclosed embodiments reduce the load on a computer by identifying, prior to computing the desired value, a subset of solutions, from among the set of all possible solutions, that include the highest confidence values for related composite objects and eliminating those other solutions such that the computer need only resolve the optimal subset of solutions to compute the desired value. In other words, the disclosed embodiments rely on desirable object relationships to identify a solution for calculating object values. The desired object relationships may be derived from data input into the system. In one embodiment, the desired object relationships reflect a high level of user interest.

The disclosed embodiments may be implemented so as to exclude solutions that include relationships that are not sufficiently corroborated so that the object values may only be derived from high quality inputs. In one embodiment, the object relationships are ranked or are hierarchical in nature, and the computing systems begins with the highest ranked relationship, then iteratively process the second-highest ranked relationship, and so on. Instead of calculating values for each possible combination, the relationships are used to cull undesirable solutions so that the optimum solution can be identified quickly.

Objects may be implemented in code, using, among other things, a tangible computer-readable medium comprising computer-executable instructions (e.g., executable software code). Alternatively, objects may be implemented as software code, firmware code, specifically configured hardware or processors, and/or a combination of the aforementioned. An object may be implemented and stored as a set of related data, e.g., a database. Objects may be implemented using a pre-defined data structure. An object may be implemented as an instance of a class that contains data and methods for processing the data. For example, an object may be a self-contained entity that includes data and procedures to manipulate the data. An object may be any item in the computing environment that can be individually manipulated, selected or processed. Objects may be exposed as shapes, pictures or words in a display screen or in a user interface.

One exemplary environment where optimizing computer processing of solutions is desirable is in financial markets, and in particular, electronic financial exchanges, such as a futures exchange, such as the Chicago Mercantile Exchange Inc. (CME). In particular, an exchange may offer multiple products and contracts for purchase that may be represented as objects in the computing system. The associated costs and values of objects may be considered to be related data sets. An exchange computer system may also be constrained by the tradable positions of markets, such as for example, bid and ask values for the different contracts, available on the exchange.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

In order to minimize risk to the exchange while minimizing the burden on members, it is desirable to approximate the requisite performance bond or margin requirement as closely as possible to the actual positions of the account at any given time. An exchange may use a settlement method to determine the position of a contract. With some objects or spread instruments, the market is sufficiently inactive during or at the end of the trading day. Very little, if any, trades may occur during a given day. In such cases, because of low liquidity and trading activity, it may be difficult to determine daily settlement prices for purposes of accurately estimating performance bond requirements. In many cases, the logic used to determine a settlement price for a contract could result in multiple viable or possible settlement prices. The logic used to estimate settlement prices may be based on the prices for related objects. Many of the objects offered are related each other with outright/spread relationships. These relationships creates numerous different possible settlement solutions. Prices of the objects may be derived from the outright or spread relationships.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Although described below in connection with examples involving instruments having multiple components, such as calendar and butterfly spread instruments, the methods described herein are well suited for determining final values for any variety of objects conforming to a set of rules or relationships, such as for example, determining settlement prices for a variety of instruments based on a related market.

Generally, the disclosed embodiments may be applicable to any computer processing system that is constrained by a variety of rules and data values. When a computer processor attempts to compute a large number of data sets in an environment including rules constraints and data constraints, the number of possible solutions or combinations of values can become unwieldy.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining" (the '667 Patent"), the entire disclosure of which is incorporated by reference herein and relied upon. For example, the methods and systems described herein may be configured as a component or module of the risk management systems described in the above-referenced patent. Alternatively or additionally, the disclosed methods may generate data to be provided to the systems described in the above-referenced patent. For example, the settlement prices determined by the disclosed embodiments may be incorporated into margin requirement(s) determined by the risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 Patent.

In one embodiment, the disclosed embodiments may be integrated or combined with a margin model, such as a margin model different from SPAN. For example, a margin model may be implemented to generate multiple settlement prices.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

An optimization module 142 may be included to generate and select best or optimum solutions for determining the value of an object. The optimization module 142 may determine solutions by analyzing a plurality of values for one or more composite objects in order to evaluate relationships between one or more objects that are included in the composite objects. The optimization module 142 may be coupled with the settlement module in order to generate a solution for the settlement module 140 to use for daily or other mark to market settlements for margining purposes. The optimization module 142 may store multiple solutions for each object.

An optimum solution or solutions may be derived from a core object and the combination(s) of objects that conform to a hierarchical prioritization of object relationships. The optimization module 142 may for example be utilized in conjunction the trade database 108 to identify user interest in one or more of the composite objects. The optimization module 142 may prioritize or rank each composite object based on user interest or other received data such as total revenue, number of users, open interest among others. The optimization module 142 may generate, identify or otherwise derive a path from, i.e. a direct or indirect mathematical linkage or relationship between, a core object to one or more base objects. The path/relationship may include or otherwise be composed of or defined by one or more composite objects that share a common base object, i.e. that themselves feature a direct or indirect mathematical linkage or relationship there between. The path may include or be specified by an ordered list of composite objects that may define a solution that the settlement module 140 may use for settlement purposes.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the settlement module 140, or other component of the exchange computer system 100.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
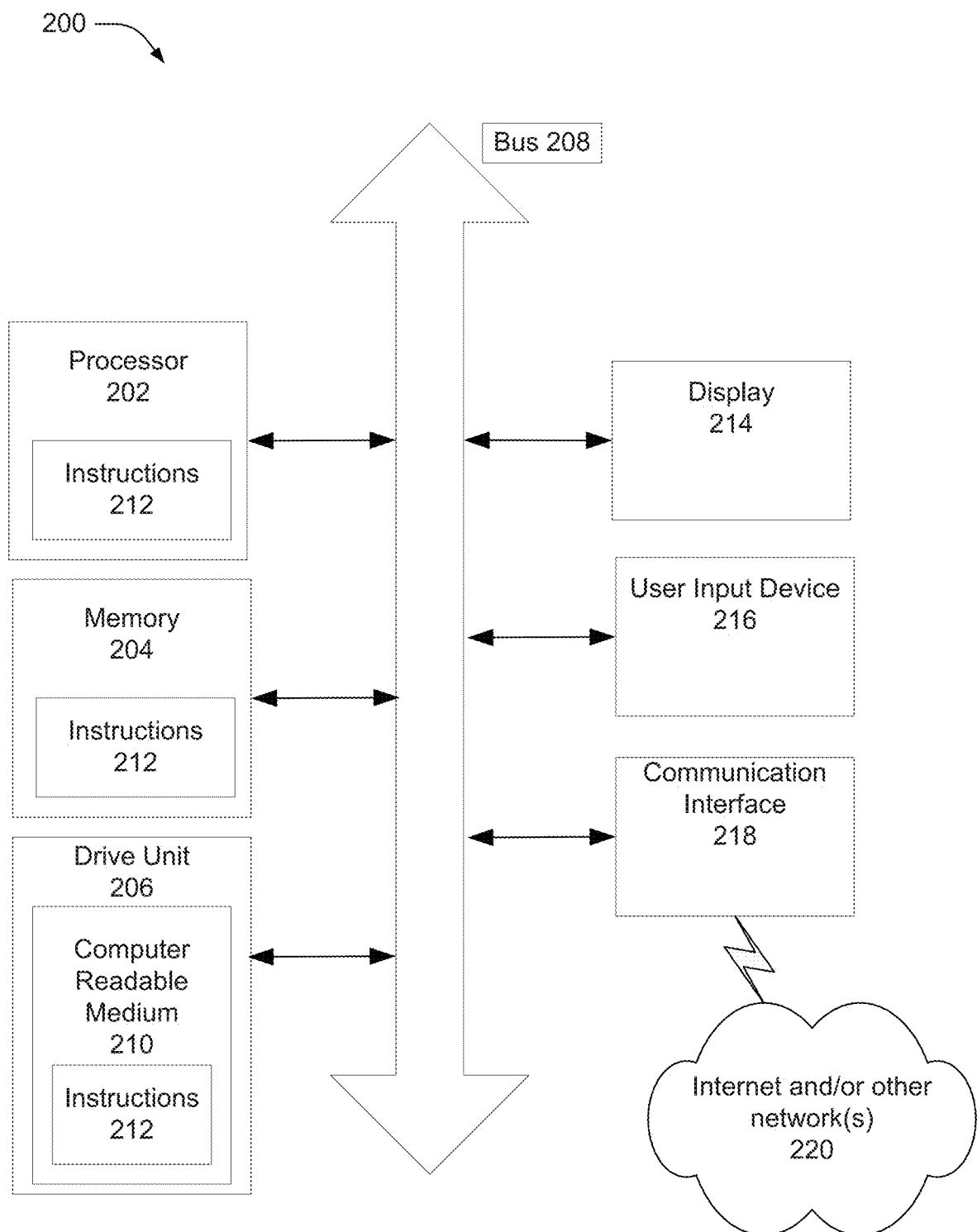
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects.

Figure 3:
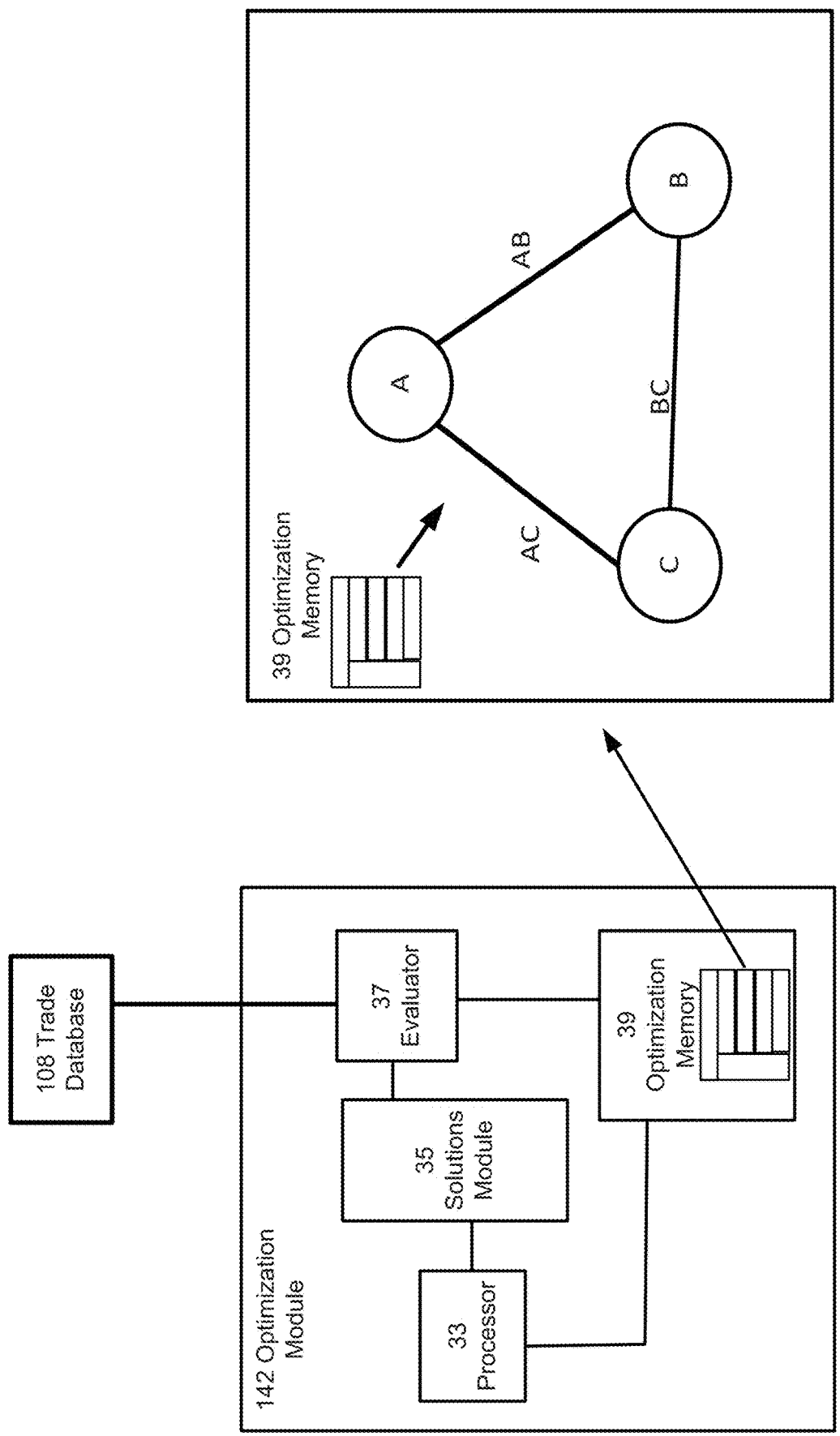
FIG. 3A depicts an illustrative embodiment of an optimization module of the computer network system of FIG. 1.
FIG. 3B depicts an illustrative example of base objects and composite objects stored in a memory of the optimization module of FIG. 3A.

FIG. 3A depicts an illustrative embodiments of an optimization module. FIG. 3A include an identification processor 33, a solutions module 35, an evaluator 37 and an optimization memory 39. The identification processor 33 is connected to the solutions module 35 and the optimization memory 39. The evaluator 37 is connected the solutions module 35 and the optimization memory 39.

The identification processor 33 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the identification processor 33 to, or otherwise be operative to identify from the set of base data objects, a core data object therein, the core data object including object value data corroborated by one or more external sources. In one embodiment, the one or more external sources may include the trade database 108, market data module 112 (not shown), or account data module 104 (not shown) among others.

The solutions module 35 may be implemented as a separate component or as one or more logic components, such as on an FPGA which may include a memory or reconfigurable component to store logic and a processing component to execute the stored logic, or as second logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the solutions module 35 to, or otherwise be operative to generate from the set of composite data objects a first subset of composite data objects comprising at least a first composite data object including the particular base data object and a second composite data object including the identified core data object. The solutions module 35 is further configured to generate from the set of composite data objects a second subset of composite data objects comprising at least a third composite data object including the particular base data object and a fourth composite data object including the identified core data object.

The evaluator 37 may be implemented as a separate component or as one or more logic components, such as on an FPGA which may include a memory or reconfigurable component to store logic and a processing component to execute the stored logic, or as third logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the evaluator 37 to, or otherwise be operative to receive data indicative of a level of activity for each of a plurality of composite data objects in the first and second subsets of composite data objects. The evaluator 37 may receive data from external sources such as the trade database 108, market data module 112 (not shown), account data module 104 (not shown) or other data source and may the same or different from the external sources from which the object value data of the identified core data object was corroborated. The evaluator 37 is further configured to derive a ranking value of the first and second subsets. The evaluator 37 is configured to select one of the subsets as an optimal solution.

The optimization memory 39 may be implemented as a separate component or as one or more logic components, such as on an FPGA which may include a memory or reconfigurable component to store logic and a processing component to execute the stored logic, or as fourth logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the optimization memory 39 to, or otherwise be operative to store the base objects and the composite objects. The base objects and composite objects may be stored as data objects in a memory or a database. The data objects may be stored in the computer's memory in any convenient form or structure, such as a linked list, or through the use of pointers. The base objects and composite objects may be stored using nodes, links, and attributes. The base objects and composite objects may be store in a table. FIG. 3B illustrates an example representation of the relationships of three base objects stored in a database in the optimization memory 39. The three base objects and the relationships between these base objects may be stored in a table or linked list. The relationships between the three base objects may be stored as attributes for the base objects or as separate data objects in the optimization memory 39. In the depicted example, there are three base objects, as shown in FIG. 3B: A, B, and C, however it will be appreciated that there may be fewer or more base objects as described herein. Each of the base objects may be given, assigned, characterized by or otherwise ascribed an estimated value. E.g. the value for A may be 5, the value for B may be 100, and the value for C may be 50. The values for each of the base objects may represent an estimate of the value of the base object. The estimate may be calculated by the settlement management module 140 as a function of received value data from, for example, the trade engine 138 or trade database 108. It should be appreciated that that the received values for base objects may be considered to be subjective values for those base objects, or based on a user's perception of the base objects. The optimization module 142, in one embodiment, selects one of the received subjective values for the base objects to determine a best objective value for each base object, where the value selected as the final value is one of the received values. In other words, the optimization module 142 selects one of multiple subjective values as representative of an objective value for that object.

The estimated value for each of A, B, and C may be estimated as varying levels of confidence based on the received data. Certain objects may be transacted multiple times over a period of time, with the value of the objects changing accordingly. With multiple samples of data from multiple transactions, the value of the object may be estimated with a high level of confidence. However, certain objects may only be transacted a few times or not at all in a given period of time. The estimated value for the objects may be uncertain or indeterminate. One solution generated by the solutions module 35 may be to derive the value of the object from the values of objects that are related to the object.

FIG. 3B, for example, depicts three composite objects AB, BC, and AC. Each of the composite objects may be one permutation out of the possible combinations of the base objects A, B, and C. For example, composite object AB may represent a transaction including both A and B. Composite BC may represent a transaction including both B and C. Different permutations may be possible, such as a composite objects with more than two base objects, a composite object that includes multiple quantities of a base object (e.g. A2B that includes one A and two B), and relationships using other mathematical concepts. As with the base objects, each of the composite objects AB, BC, and AC may be assigned a value derived from data received by the evaluator 37. The data received may value the composite objects as a whole and not the individual components. For example, the composite object AB may be transacted and assigned a price as the combination of AB instead of valuing each individual piece or leg of the composite object and then calculating the value. However, the value of the composite objects may be closely related to the value of the underlying base objects. As such, an estimate of the value of the base objects may be derived from the composite objects and vice versa.

In FIG. 3B, the three base objects are related to one another through the composite objects. Accordingly, an estimate of the value of each of the base objects may be derived from the other base objects or the value of one or more of the composite objects. For example, if the value of the base object B is not known, but the value of A and the value of the composite object AB are known, then the value of B may be calculated by subtracting the value of A from the value of AB (if composite object AB represents A+B). Alternative solutions of calculating the value of B may exist depending on the known values. The value of base object B may also be calculated if the value of A and the values of composite objects AC and BC are known. The value of base object B may be calculated by BC minus AC plus A. The value of B may be calculated if C is known by using the value of BC. The value of B may be calculated if C is known by using the values of AC and AB.

Each of these solutions may derive a different value for B. With up to date and fully vetted data and values, each of the solutions could arrive at the same value. However, for many of the objects, the known data may be insufficient. Certain objects or composite objects may be sparely transacted by only a few parties. Additionally, the amount and quality of data for each of the objects and composite objects vary over time. Using the examples in FIG. 3B, the object B may be calculated, using multiple solutions generated by the solutions module 35. For this example, the object A may be considered a core object. The processor 35 may identify a core object based on a level of activity or interest corroborated by an external source. For example, a core object may be an object that has a value that is widely agreed upon by external parties, e.g. a benchmark object. The value for a core object may still be an estimate, but the value may be estimated with a high level of confidence. Core objects may also be given or assigned a value (or use inputs) from a reputable source.

With the value of core object A known, the solutions module 35 may generate two solutions that may be used to derive the value of object B. The first solution uses a value of AB. The second solution uses the values of AC and BC. The first solution and the second solution may derive different values object B. For example, the composite object AB may be sparely transacted. If the last transaction of composite AB was done at a first time and the value of object B is to be estimated at a later time, the estimate may be off. For example, the last transaction of AB was recorded several hours prior to when the value of object B is calculated. The composite objects AC and BC may be transacted more often or the composite objects AC and BC may be transacted by more parties or with larger volumes or revenues. In either scenario, the solution that incorporates the values of AC and BC may estimate the value of B with higher confidence. The optimization memory 39 may store the solutions as data objects. The optimization memory 39 may remove or purge or set to be overwritten solutions that are non-optimal.

In one embodiment, a computing system may receive values for composite objects, and the computing system attempts to determine values for the base objects in accordance with relationships associated with the base objects and composite objects. In particular, the system may receive user interest for the composite objects. The user interest may be used as a confidence indicator for pricing of the composite object. A high user interest may indicate a high confidence that a composite object's price is indicative of the value of the composite object and underlying base objects.

In an embodiment, a computing system identifies a first subset of composite data objects. The computer system identifies a second subset of composite data objects. The computing system evaluates each of the first and second subset and selects the optimal subset. The first and second subsets may correspond to two different solutions for calculating a value of an object. The evaluation may use received market data such as revenue or broker marks.

In an embodiment, a computing system may receive values for composite objects that indicate the revenue for each composite object. The composite objects are evaluated based on the received revenue data. The evaluation of the composite objects may be used to identify a solution for calculating the value of a base object.

In an embodiment, a computing system identifies a set of transacted composite objects and assigns a ranking value to each composite object in the set based on received data. Low rated composite objects are excluded. The remaining set of composite objects is used to generate a graph for one or more base objects. The computing system generates a maximum spanning tree from the graph that identifies one or more paths that may be used to estimate values of base objects.

In an embodiment, the optimization module is configure to rapidly and efficiently determine solutions for estimating values for objects by using the values of composite objects that meet predetermined rules for the composite objects. Predetermined rules may be programmed into the computer. An example predetermined rule may be a rule about the volume of transactions or number of users or user interest. The rules may be hard rules, or system requirements. Alternatively, rules may be soft rules that are not requirements but reflect system or user preferences.

When applied to a financial exchange computer system, the embodiments described herein may utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It should be appreciated that the disclosed embodiments may use other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 220 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names. The legs may be referred to as base objects; the combinations may be referred to as composite objects. An exchange computer system may not offer each and every possible combination, rather only a subset of the possible combinations referred to as exchange-defined combinations.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading includes those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, market data (and/or bid/ask data) may be gathered or obtained from open outcry pits and/or other sources and incorporated into the trade and market data from the electronic trading system(s).

In order to minimize risk to the exchange while minimizing the burden on members, it is desirable to approximate the requisite performance bond or margin requirement as closely as possible to the actual positions of the account at any given time. An exchange may use a settlement method to determine the position of a contract.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. A settlement module 140 of the exchange computer system 100 may implement one or more settlement price solutions. The settlement price determination techniques or solution may be generated by the optimization module. The optimization module may attempt to arrive at a solution by using related objects, spreads or products. The optimization module attempts to objectively value the inactive object by using related objects that are active enough so that any information or value data derived from the active related objects may be used with a level of confidence in evaluated the original base object.

One inefficient method for selecting a settlement price determination is to take a simple path from a core object. Such a path may be calculated automatically, using for example, a shortest path algorithm. A simple path may also be manually generated and selected by a user.

Figure 4:
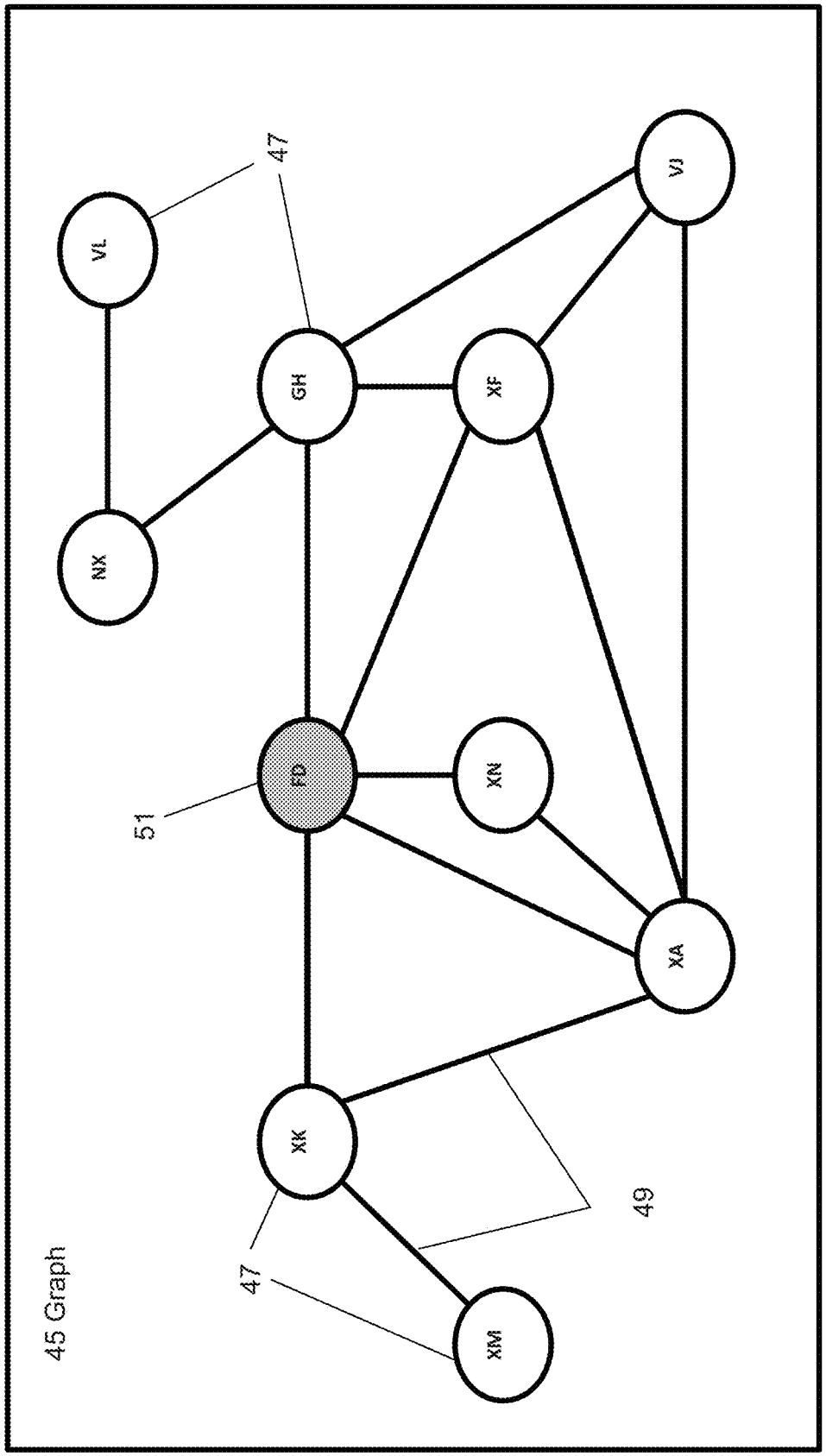
FIG. 4 depicts an example graph of base objects and composite objects.

FIG. 4 depicts an example graph of base objects and composite objects. The graph illustrates the relationships between the base objects 47 as defined by the composite objects 49. The vertices 47 of the graph represent the base objects 47 (outright products) that are offered on an exchange system. The edges 49 of the graph represent the composite objects 49 (spreads etc.) that are offered on the exchange system. The composite objects 49 that are offered on the exchange system (exchanged defined combinations) are a subset of the total combinations of the base objects possible.

FIG. 4 further includes a core product 51, here represented by the base object FD. A core product may be a product that is a benchmark futures like NYMEX WTI futures, NYMEX RBOB futures, ICE Brent futures among others. A core product may also represent a product that is very well traded. Accordingly, the price of the core product is well accepted by the community as a benchmark.

FIG. 4 illustrates ten base objects 47 labeled as XM, XK, XA, XN, NX, VL, GH, XF, VJ, and FD. Each of these base objects may be transacted by themselves (outright) or in combination with one another (as spreads etc.). For the ten base objects, there exist thousands upon thousands of possible combinations that may be transacted. An exchange system may only transact in a small subset of the possible combinations as exchanged defined combinations. In FIG. 4, there are 13 exchange defined combinations (referred to as composite objects 49) shown. In the graph 45, the composite objects 49 are shown as edges between the base objects 47 and core object 51. The value of the composite objects 49 may be priced by broker marks e.g. by using the average of broker data or another solution.

For the example shown in FIG. 4, each of the composite objects 49 may represent a spread, e.g. a combination of two or more base objects. The thirteen spreads are described below in Table 1. Each of the combination objects has a first leg and a second, leg e.g. the base objects that make up the spread.

TABLE 1

| Spread code | Leg 1 | Leg 2 |
|---|---|---|
| HB | XF | XA |
| FH | XM | XK |
| IP | XN | XA |
| IT | XA | FD |
| IX | XK | XA |
| VI | XF | VJ |
| IN | XK | FD |
| GG | FD | GH |
| HH | VJ | XA |
| UP | NX | VL |
| IQ | XN | FD |
| NI | NX | GH |
| VH | XF | FD |
| VN | VJ | GH |
| VX | XF | GH |

Figure 5:
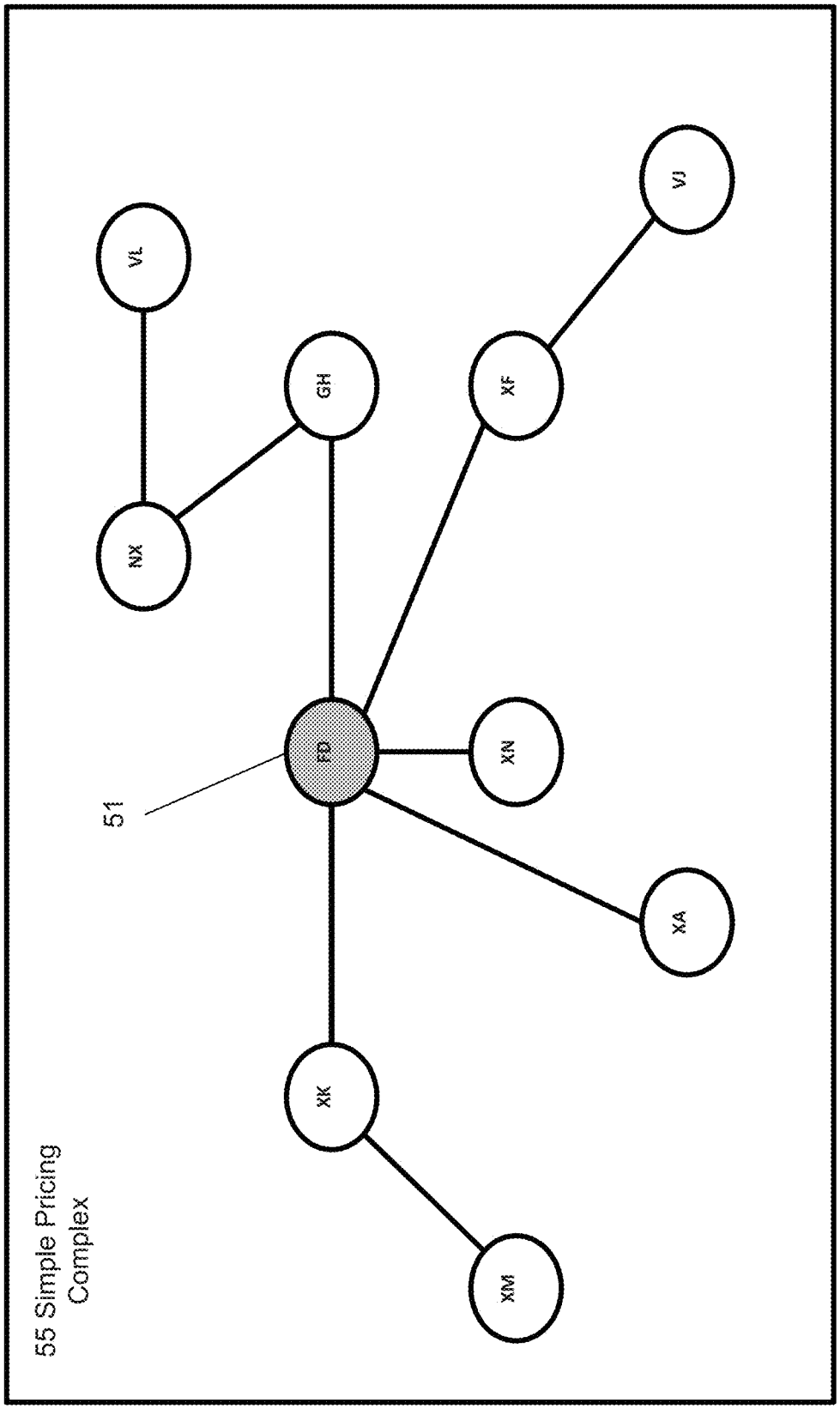
FIG. 5 depicts an example simple pricing complex.

FIG. 5 depicts a simple pricing complex 55 from the core object 51. As shown, each of the ten base objects may be priced by taking a simple path using the composite objects to the core object 51. For example, the price XA, the solution uses the composite object XA-FD. To price VJ, the solution uses the composite object VJ-XF and XF-FD. Certain composite objects in the graph 45 of FIG. 4 are not used by any of the solutions. For example, the composite object XA-XN is not used. There may be alternative simple solutions that include similar path lengths. For example, an alternative set of spreads uses may include XA-VJ instead of XF-VJ.

There may me multiple methods for evaluating the solutions as shown in FIG. 5. One method may be to calculate the total interest or the total revenue for either the individual solutions or the product complex as a whole.

For this example, the following values may be used:

TABLE 2

Total open interest for the products in the pricing routes

| | | | |
|---|---|---|---|
| FH | XM | XK | 320 |
| IN | XK | FD | 480 |
| IT | XA | FD | 8230 |
| IQ | XN | FD | 2 |
| GG | FD | GH | 268 |
| PP | NX | GH | 0 |
| VH | XF | FD | 0 |
| VI | XF | VJ | 4988 |
| UP | NX | VL | 3546 |
| | | total | 17834 |

TABLE 3

Total revenue from the products in the pricing routes

| | | | |
|---|---|---|---|
| FH | XM | XK | $ 16,205.00 |
| IN | XK | FD | $ 24,902.00 |
| IT | XA | FD | $194,613.00 |
| IQ | XN | FD | $    795.00 |
| PP | NX | GH | 0 |
| GG | FD | GH | $ 17,469.00 |
| VH | XF | FD | $    127.00 |
| VI | XF | VJ | $106,665.00 |
| UP | NX | VL | $ 86,514.00 |
| | | total | $447,290.00 |

For the simple pricing complex 55 described in FIG. 5, the total open interest is 17,834. The total revenue is $447,290. These values may change over time as the underlying open interest or revenue changes for the composite objects. Additionally if other composite objects are substituted in, the total revenue and open interest of the pricing complex may change. Alternative methods for evaluation may be used. For example, the open interest may be calculated for each base product and then totaled. Such a calculation may purposefully double count certain composite objects that are used more often than others. Methods may weight one or more composite objects differently that have a higher level of confidence. In certain embodiment, market data received later may be treated differently than market data received earlier (or further away from when a settlement price is to be calculated). For example, data received early in the day may be less indicative of an accurate value that is estimated at the close of business.

One priority for generating the path 55 such as the one in FIG. 5 is to maximize the interest or revenue for the pricing complex. Higher interest and/or higher revenue may indicate a pricing complex that is more efficient and accurate at pricing individual objects than a pricing complex that has lower revenue or lower interest. The optimization module 142 is trying to objectively value an object which has a subjective value. For objects that have insufficient interest or revenue, a value may still be derived from related objects that have external/subjective/independent corroboration of value.

In an embodiment, the optimization module 142 identifies each possible solution for a pricing complex. The optimization module 142 evaluates or scores the solutions for each composite object. The optimization module 142 selects an optimal pricing complex for the product or the product complex. The optimization module 142 transmits the selected pricing complex to the settlement module 140.

Figure 6:
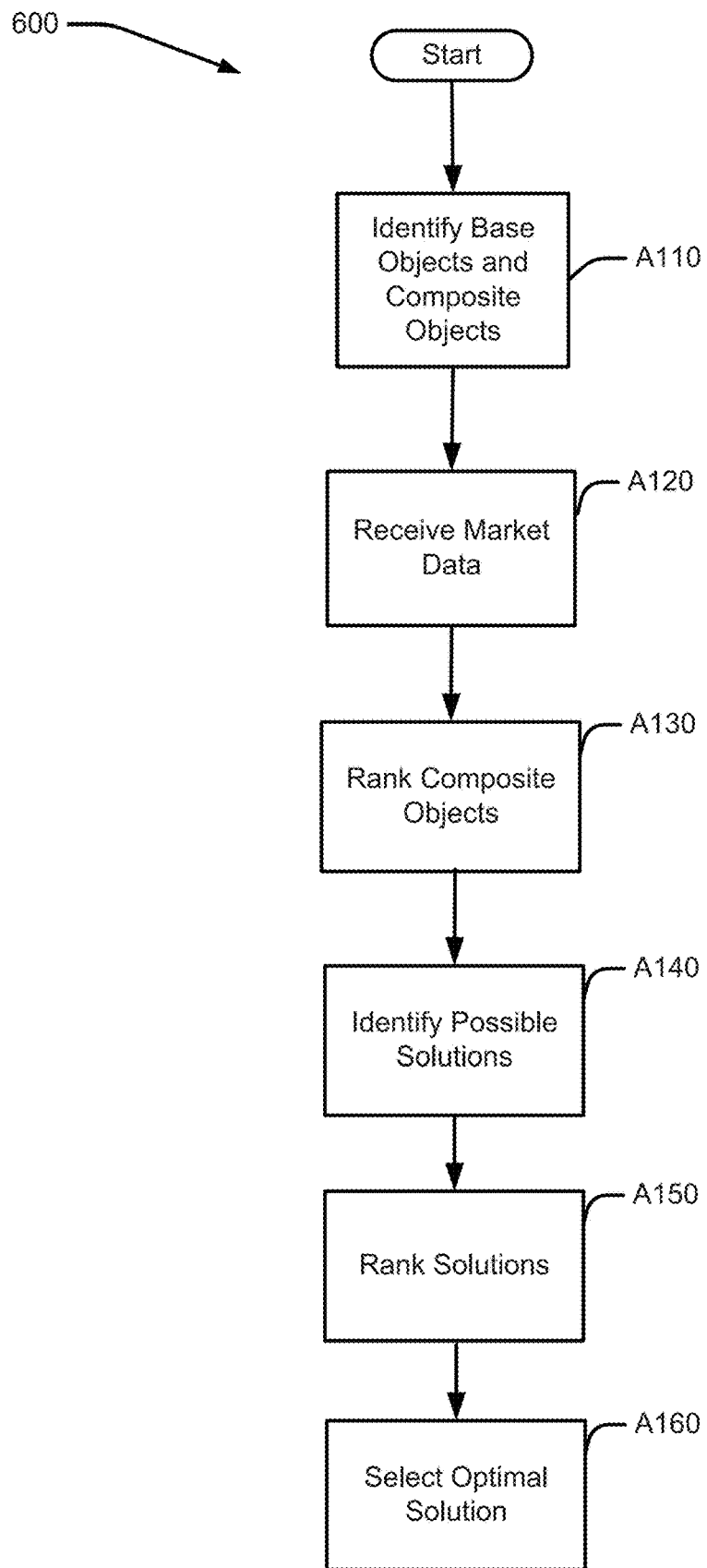
FIG. 6 depicts an example flowchart indicating a method of implementing the disclosed optimization system.

FIG. 6 depicts an example flowchart 600 indicating a method of implementing the disclosed optimization system, as may be implemented with computer devices and computer networks, such as those described with respect to FIGS. 1 and 2. Embodiments may involve all, more or fewer actions indicated by the blocks of FIG. 6. The actions may be performed in the order or sequence shown or in a different sequence.

At act A110, the optimization module 142 identifies a set of base objects and a set of composite objects offered by the exchange. In an embodiment, a base object may represent an outright product and a composite object may represent a product spread. The composite objects may include the base objects. For example, a composite object AB may be comprised of base object A and base object B.

FIG. 4 illustrates a set of base objects and a set of composite objects offered by the exchange. As shown, FIG. 4 includes base objects 47 XM, XK, XA, XN, NX, VL, GH, XF, VJ, and FD. FIG. 4 further includes seventeen composite objects 49 represented by the edges or connections between base objects 47. A composite object 49 may be defined by the components included within e.g. the base objects 47. However, a composite object 49 may be traded on its own and with its own market and order book. As such, while a composite object's price may be related to the component base objects, there may be some variation in pricing between the composite object and the total of the component base objects.

At act A120, the optimization module receives market data for the composite objects 49. The market data may include a level of activity such as revenue for each of the composite objects 49 for a time period. The market data may include the number of brokers transacting the composite object. The market data may include trading volume, open interest, transaction data or other market data. The market data may be stored in memory, in the optimization module, or another module.

At act A130, the optimization module derives a score or ranking value for each composite object 49 using the received market data. The ranking value may be calculated as a direct ranking of one or more values from the market data. For example, the composite objects 49 may be ranked by revenue with the composite object with the highest revenue given the highest ranking. In another embodiment, the ranking may be derived from multiple values from the market data. For example, the ranking value may be calculated using the following equation: Ranking=# of brokers submitting marks for that composite object+α. More interest or activity in the composite object indicates higher confidence in the estimated value of the composite object and as such the composite object is assigned a higher ranking.

In an embodiment, the values of α for each composite object 49 are determined using either revenue from the composite object or open interest as described in Table 4 below.

TABLE 4

α value table

| Revenue from the composite object | α |
|---|---|
| revenue < $50000 or # of broker marks = 0 | 0 |
| $50000 ≤ revenue < $100000 | 1 |
| $100000 ≤ revenue | 2 |

α value table

TABLE 4-continued

| Composite object open interest | α |
|---|---|
| open interest < 2000 or # of broker marks = 0 | 0 |
| 3000 ≤ open interest < 5000 | 1 |
| 5000 ≤ open interest | 2 |

Table 5 below shows an example set of rank values for each composite object 49.

TABLE 5

| Composite Object | Leg 1 | Leg 2 | Revenue | open interest | # of broker marks | Ranking |
|---|---|---|---|---|---|---|
| HB | XF | XA | 114085 | 5654 | 4 | 8 |
| FH | XM | XK | 16205 | 320 | 5 | 5 |
| IP | XN | XA | 145007 | 6354 | 3 | 7 |
| IT | XA | FD | 194613 | 8230 | 3 | 7 |
| IX | XK | XA | 112315 | 5020 | 3 | 7 |
| VI | XF | VJ | 106665 | 4988 | 3 | 6 |
| IN | XK | FD | 24902 | 480 | 3 | 3 |
| GG | FD | GH | 17469 | 268 | 1 | 1 |
| HH | VJ | XA | 77861 | 3877 | 0 | 0 |
| UP | NX | VL | 86514 | 3546 | 1 | 1 |
| IQ | XN | FD | 795 | 2 | 0 | 0 |
| NI | NX | GH | 756 | 15 | 0 | 0 |
| VH | XF | FD | 127 | 0 | 0 | 0 |
| VN | VJ | GH | 5 | 0 | 0 | 0 |
| VX | XF | GH | 573 | 13 | 0 | 0 |

In certain embodiment, the ranking may be a direct reflection of the market data received. For example, the ranking may be a numerical ranking of the revenue of the composite object 49 or the open interest. In certain embodiments, a scale of rank values is used where a high ranking is optimal. In certain embodiment, a scale is used where a low ranking is optimal. In certain embodiments, the rank values increase linearly. In certain embodiment, the rank values increase exponentially. For example, a ranking value of 6 may indicate a medium level of confidence. A ranking value of 12 may or may not indicate double the level of confidence depending on if the scale of the ranking system is linear or non-linear. Using ranking values, the composite objects 49 may be separated into buckets or categories such as low, medium, and high.

Figure 7:
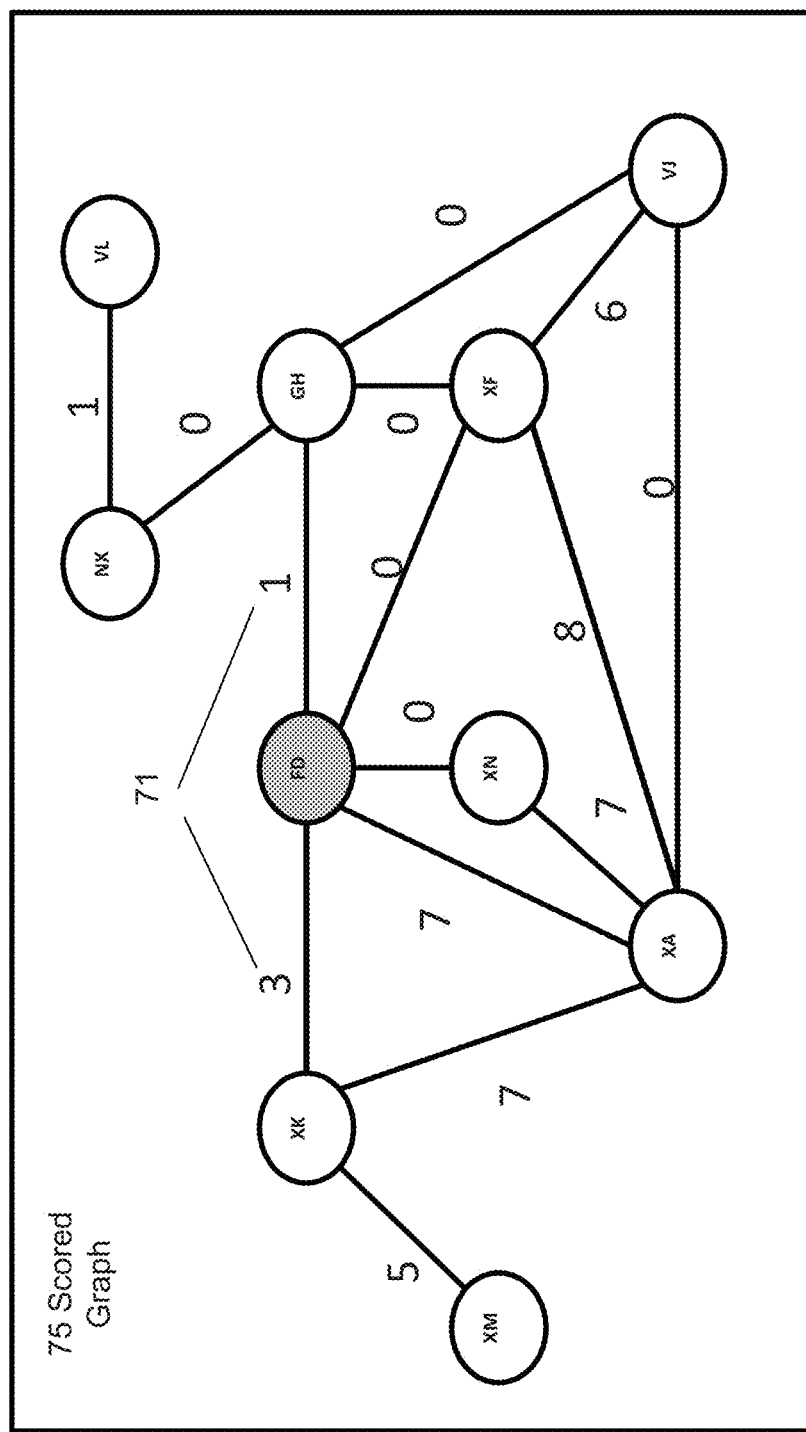
FIG. 7 depicts an example rated graph.

FIG. 7 depicts an example rated graph 75. FIG. 7 includes example ranking values for each composite object according to Table 5. Each composite object 49 has a rank 71. For example, the composite object with XK and FD (listed above in the table as composite object IN) as its base objects has a rank of 3.

At act A140, the optimization module identifies possible solutions for calculating a value for one or more of the base objects 47. The optimization module 142 may identify one or more core objects 51 among the base objects 47. A core object is an object that has a known value or an estimated value that is generally agreed upon by a market. Core objects may be, for example, benchmark futures. Each core product may be transacted often enough for a system to estimate its value with a high level of confidence at for any specific time period. The value of a core object may also be corroborated directly by external sources or indirectly though external value data. Accordingly, the value of a core product may be considered "known" to an exchange system and an optimization module 142.

From the core product 51, the optimization module 142 may generate possible solutions for calculating the value of the base objects. As shown in FIG. 4, each composite object connects (or describes a relationship) between two base objects. In certain embodiments, the composite objects may include three or more base objects or other combinations. Using the composite objects, or relationships, the optimization may determine one or more paths from an object to a core object. For example, in FIG. 4, multiple paths may be taken from VJ to FD; e.g. VJ to GH to FD; VJ to XF to FD; VJ to XA to XN to FD; among others.

In certain embodiments, composite objects that have low rank values may be excluded from the possible solutions. A threshold rank may be uses as a cutoff to exclude low scoring composite objects. For example, for the composite objects 49 of FIG. 7, the composite objects with a zero rank may be excluded. A rank of zero may indicate low number of broker marks, low open interest, low volume, or low revenue depending on the data used to generate the rank. A low rank may also indicate that the estimated value of the composite object is not estimated with a high level of confidence. Accordingly, when using an estimated value of the composite object to estimate a value of a base object, there is a preference for high scoring composite objects in order to accurately price the base object. A high rank may indicate that the data supplied by the composite object for an eventual solution is of high quality. The high rank may indicate that external source have corroborated the estimated value of the composite object either by showing interest directly or indirectly.

A solution including multiple composite objects may only allow for a confidence level of the lowest scoring composite object. For example, a solution includes three composite objects. A, B, and C and both A and B rate high but C scores low. The overall confidence level in the solution is brought down to the level of C. If C is off by 50%, the final value calculated by the solution may also be off by at least 50% (depending on the accuracy of A and B).

At act A150, the optimization module evaluates the solutions. The solutions may include one or more composite objects. The rank values for each of the composite objects calculated in A150 may be used to calculate a rank value for the solution. In certain embodiments, the rank value for a solution is the total score of each of the composite objects that make up the solution. For example, in FIG. 7 there are multiple solutions for calculating the value of VJ from the core object FD. Using the total of all composite objects included in the path, the rank value for the path VJ-XF-FD may be 6. The rank value for VJ-GH-FD is 1. The rank value for VJ-XF-XA-FD is 21.

In certain embodiments, the rank value for a solution is calculated by taking the rank value of each of the composite objects, adding the rank values together and dividing the total by the number of composite objects to determine an average rank value. For example, in FIG. 7 there are multiple solutions for calculating the value of VJ from the core object FD. Using the average of all composite objects included in the path, the rank value for the path VJ-XF-FD may be 3. The rank value for VJ-GH-FD is 0.5. The rank value for VJ-XF-XA-FD is 7.

In certain embodiments, the rank value for a solution reflects the lowest rated composite object in the solution, e.g. the composite object that is least corroborated by external sources. For example, in FIG. 7 there are multiple solutions for calculating the value of VJ from the core object FD. Using the lowest ranking composite object of all composite objects included in the path, the ranking for the path VJ-XF-FD may be 0. The ranking for VJ-GH-FD is 0. The ranking for VJ-XF-XA-FD is 6.

In certain embodiments, the ranking is based on the number of composite objects in the solution. For example, in FIG. 7 there are multiple solutions for calculating the value of VJ from the core object FD. Using the total number of all composite objects included in the path, the ranking for the path VJ-XF-FD may be 2. The ranking for VJ-GH-FD is 2. The ranking for VJ-XF-XA-FD is 3.

At act A160, the optimization module selects one or more optimal solutions. The optimization module may use the rank values generated in act A150 to determine which solution is optimal for each individual base object. Alternatively, the optimization module may determine a ranking value for an entire product complex and select solutions based on the ranking. The one or more optimal solutions may be stored in memory. Alternative non-optimal solutions may be removed from or designated to be overwritten in memory.

The value of a base object may be calculated using the optimal solution. The value may be calculated by the settlement module or by the optimization module and then reported to the settlement module. A confidence level may be identified that relates to the ranking of the solution. The confidence level may be transmitted to the settlement module along with the value of the object or the solution.

One or more of these acts may be repeated over time. For example, a value for each object may be recalculated at the end of the day or at various points during the day. The optimization module may receive data throughout the day and may recalculate ranking values for each of the composite objects.

Figure 8:
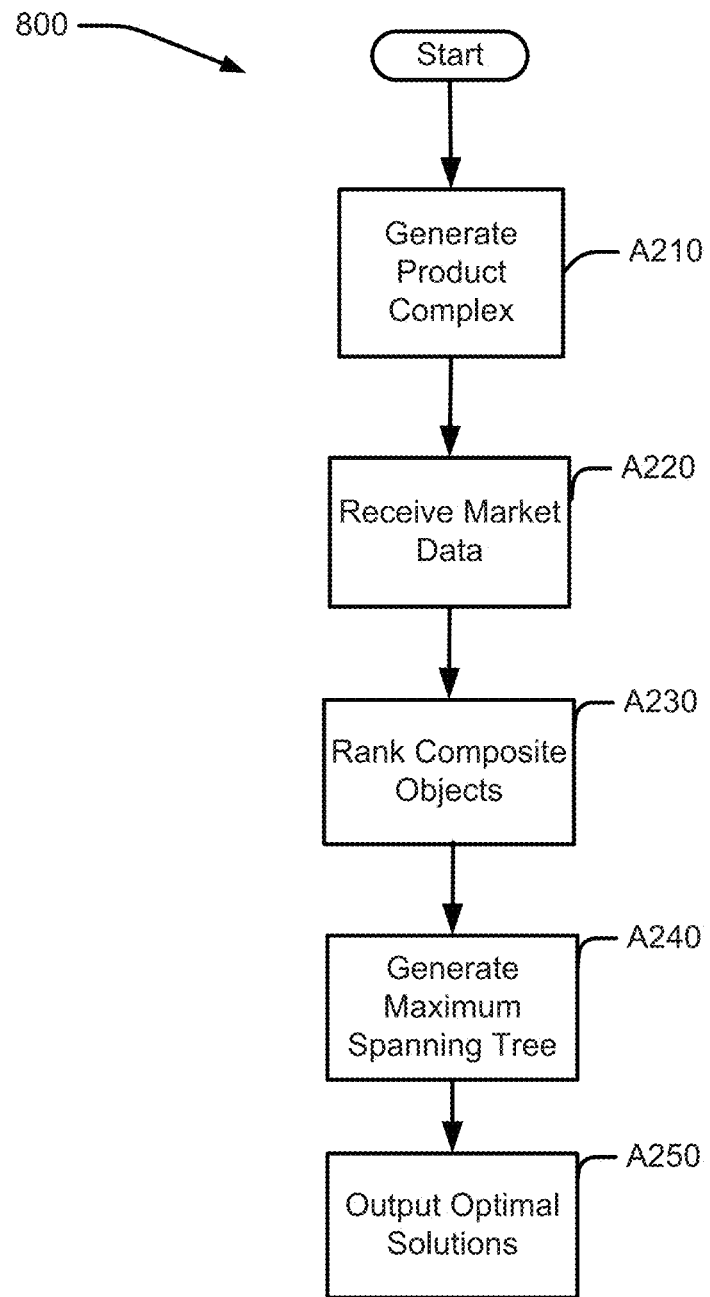
FIG. 8 depicts an example flowchart indicating a method of implementing the disclosed optimization system using a maximum spanning tree.

For certain large sets of objects, the above described flowchart may be altered by limiting the number of solutions that are rated or scored. FIG. 8 depicts an example flowchart 800 indicating a method of implementing the disclosed optimization system using a maximum spanning tree, as may be implemented with computer devices and computer networks, such as those described with respect to FIGS. 1 and 2. Embodiments may involve all, more or fewer actions indicated by the blocks of FIG. 8. The actions may be performed in the order or sequence shown or in a different sequence.

At act A210, an exchange system generates a product complex from a set of base objects and a set of composite objects offered by the exchange system. The composite objects may comprise a subset of possible combinations of the base objects. Each of the composite objects, for example, may include two or more base objects. For example, a composite object AB may include both base objects A and B. Each composite object may be transacted separately from the outright base objects and as such may have a value that while related to the base objects, may differ at certain points in time. As such, the value of the composite object may be estimated from the values of the base objects and vice versa.

The set of base objects may include one or more core products. The product complex may be limited to a subset of base objects and composite objects that are related to one or more of the core products. In certain embodiments, the base objects and composite objects connected to a core product may comprise a sub-group of the product complex. For example, in FIG. 4, there is a single core product.

Figure 9:
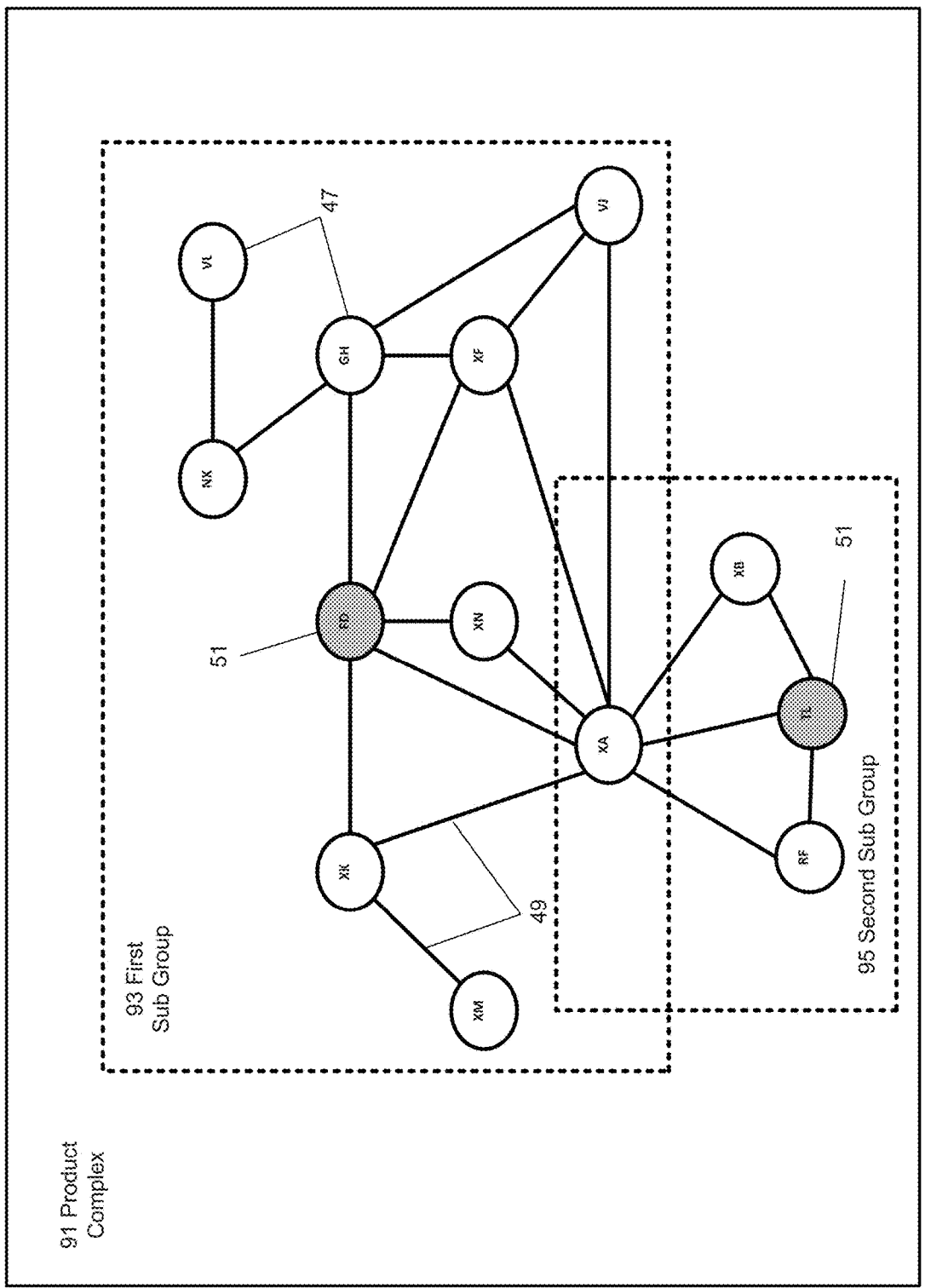
FIG. 9 depicts an example product complex including multiple core products.

FIG. 9 depicts a product complex 91 including multiple core products 51. In FIG. 9 there are two core products 91 labeled as FD and TL. Each of the base objects 47 that are connected to the first core product FD may comprise a first sub-group 93. Each of the base objects that are connected to the second core object TL may comprise a second sub-group 95. In certain embodiments, there may be overlap between product complexes. For example, a base object and/or a composite object may be included in both sub-groups. As shown by FIG. 9 the base object XA is included in both the first sub-group 93 and the second sub-group 95. In certain embodiments, the sub-groups may be defined manually or automatically by following pre-set rules or preferences. For example, the sub-groups may be limited to base objects within a threshold number of connections from a core object.

The relationship of the base objects and composite objects may be illustrated by using a graph. FIG. 9 illustrates an example graph of base objects 47 and composite objects 49. The base objects are represented by the nodes or vertices. The composite objects are represented by the links or edges.

At act A220, the exchange system receives market data for one or more composite objects 49. Market data may include data indicative of a level of activity or a number of participants; data such as revenue, volume, interest, number of brokers, or other market data. Table 6 below illustrates example revenue, open interest and # of broker marks for the composite objects 49 of the first sub group 93 in FIG. 9.

TABLE 6

| Composite Object | Leg 1 | Leg 2 | Revenue | open interest | # of broker marks |
|---|---|---|---|---|---|
| HB | XF | XA | 114085 | 5654 | 4 |
| FH | XM | XK | 16205 | 320 | 5 |
| IP | XN | XA | 145007 | 6354 | 3 |
| IT | XA | FD | 194613 | 8230 | 3 |
| IX | XK | XA | 112315 | 5020 | 3 |
| VI | XF | VJ | 106665 | 4988 | 3 |
| IN | XK | FD | 24902 | 480 | 3 |
| GG | FD | GH | 17469 | 268 | 1 |
| HH | VJ | XA | 77861 | 3877 | 0 |
| UP | NX | VL | 86514 | 3546 | 1 |
| IQ | XN | FD | 795 | 2 | 0 |
| NI | NX | GH | 756 | 15 | 0 |
| VH | XF | FD | 127 | 0 | 0 |
| VN | VJ | GH | 5 | 0 | 0 |
| VX | XF | GH | 573 | 13 | 0 |

At act A230, the exchange system evaluates the one or more composite objects using the market data. The market data may be used to ascertain if the data from a composite object is accurate. For example, the value of a composite object may be verified in that external sources have actively traded the composite object at a particular value. An actively traded or transacted or watched composite objects may be less prone to user's exploiting price differences. In the example illustrated in FIG. 9, the rank value for the composite object is calculated by adding $\alpha$, $\beta$, and the # of broker marks. The values of $\alpha$ and $\beta$ are generated by the following table:

TABLE 7

| $\alpha$ value table | |
|---|---|
| Revenue from the product | $\alpha$ |
| revenue < $50000 or # of broker marks = 0 | 0 |
| $50000 ≤ revenue < $100000 | 1 |
| $100000 ≤ revenue | 2 |

| $\beta$ value table | |
|---|---|
| product open interest | $\beta$ |

TABLE 7-continued

| | |
|---|---|
| open interest < 2000 or # of broker marks = 0 | 0 |
| 3000 ≤ open interest < 5000 | 1 |
| 5000 ≤ open interest | 2 |

The rank values for the composite objects are as follows:

TABLE 8

| Composite Object | Revenue | α | open interest | β | # of broker marks | Rank Value |
|---|---|---|---|---|---|---|
| HB | 114085 | 2 | 5654 | 2 | 4 | 8 |
| FH | 16205 | 0 | 320 | 0 | 5 | 5 |
| IP | 145007 | 2 | 6354 | 2 | 3 | 7 |
| IT | 194613 | 2 | 8230 | 2 | 3 | 7 |
| IX | 112315 | 2 | 5020 | 2 | 3 | 7 |
| VI | 106665 | 2 | 4988 | 1 | 3 | 6 |
| IN | 24902 | 0 | 480 | 0 | 3 | 3 |
| GG | 17469 | 0 | 268 | 0 | 1 | 1 |
| HH | 77861 | 0 | 3877 | 0 | 0 | 0 |
| UP | 86514 | 0 | 3546 | 0 | 1 | 1 |
| IQ | 795 | 0 | 2 | 0 | 0 | 0 |
| NI | 756 | 0 | 15 | 0 | 0 | 0 |
| VH | 127 | 0 | 0 | 0 | 0 | 0 |
| VN | 5 | 0 | 0 | 0 | 0 | 0 |
| VX | 573 | 0 | 13 | 0 | 0 | 0 |

In Table 8, for example, the composite object HB has 114,085 of revenue, 5,654 open interest, and 4 broker marks. Using Table 7, the rank value for composite object HB is α+β+broker marks which equals 2+2+4=8.

Composite objects with rank values of zero may be excluded. In certain embodiments, a threshold rank value may be used to exclude low rated composite objects. For example, in Table 8 above, the composite objects IQ, NI, VH, VN, and VX may be excluded as these composite objects have a zero rank value. A zero rank value may indicate that the composite objects have little to no interest or revenue (depending on the rank value calculations and inputs). As the composite objects have little interest or revenue, the exchange system is unable to verify that the price or other data for the composite object is accurate. As such, the exchange system attempts to not use composite objects with low ranking values. After excluding low rated composites, the remaining subset of composite objects may be used to generate paths (solutions) for calculating values for the base objects.

At act A240, the exchange system generates paths between the base objects and a core object using a maximum spanning tree algorithm with the generated rank values as the weights. A maximum spanning tree is a spanning tree of a weighted graph having maximum weight. A maximum spanning tree may be computed by using Kruskal Algorithm with edges sorted into decreasing order.

Figure 10A:
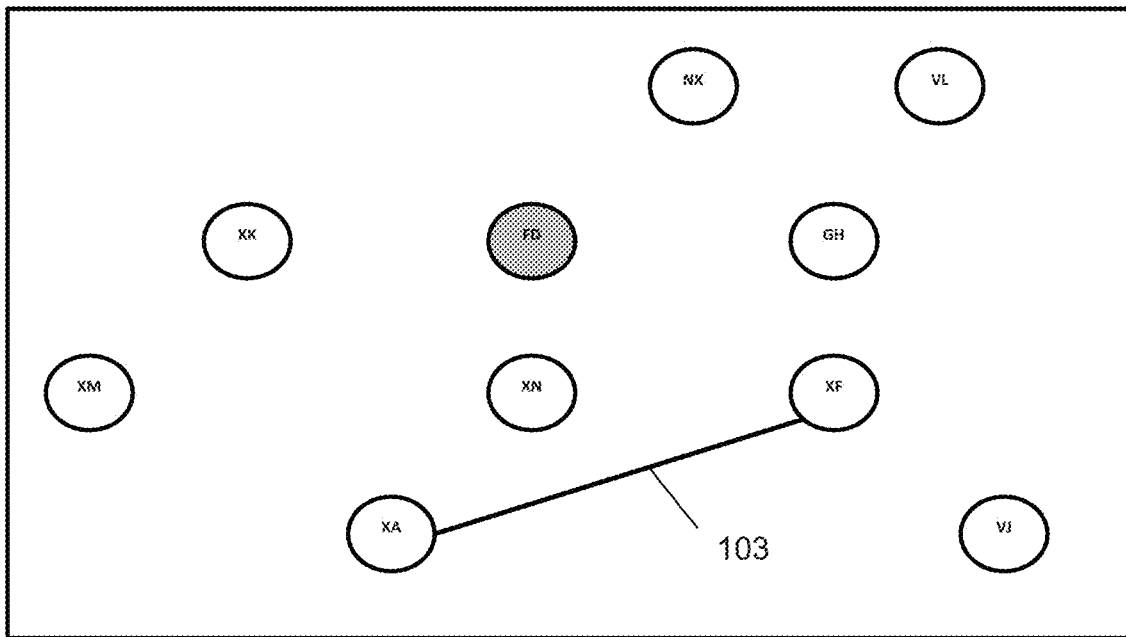
FIG. 10A and FIG. 10B depict a maximum spanning tree for an example sub group of the product complex of FIG. 9.
Figure 10B:
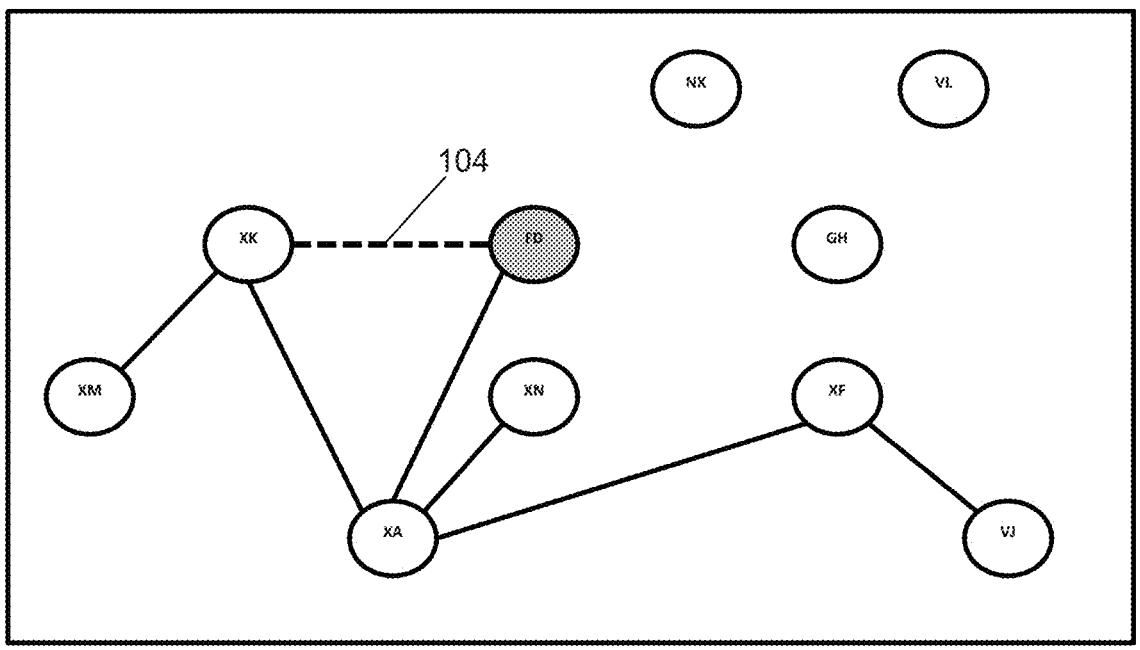

FIG. 10A and FIG. 10B depict a maximum spanning tree for the first sub group of the graph of FIG. 9. Using the table 8 above and excluding the composite objects with a zero rank value, the composite objects are sorted from highest to lowest rank value. Using the highest ranked composite object, the system identifies the edge (composite object) in the graph accordingly then adds the two related base objects to a temporary group. The highest scoring composite object is composite object 103 referred to in table 8 as HB. Composite object HB has as its legs XF and XA. The composite object HB is shown in FIG. 10A.

As shown in FIG. 10B, additional composite objects are added to the graph starting with the next highest ranked composite object with the legs (base objects) being added to the temporary group. Composite objects with both legs (base objects) in the temporary group are not added as this generates a closed loop. Proceeding down the table of rankings, the next composite segments are added to the graph. These composite objects include (XK-XA), (FD, XA), (XA-XN), (XF-VJ), and (XM, XK) as shown in FIG. 10B. In the example, we will skip (XK-FD, shown as a dotted line 104) because both of the legs (XK and FD) are already in the temporary group. Adding this composite object would create a closed loop of XK, FD, and XA.

Figure 11:
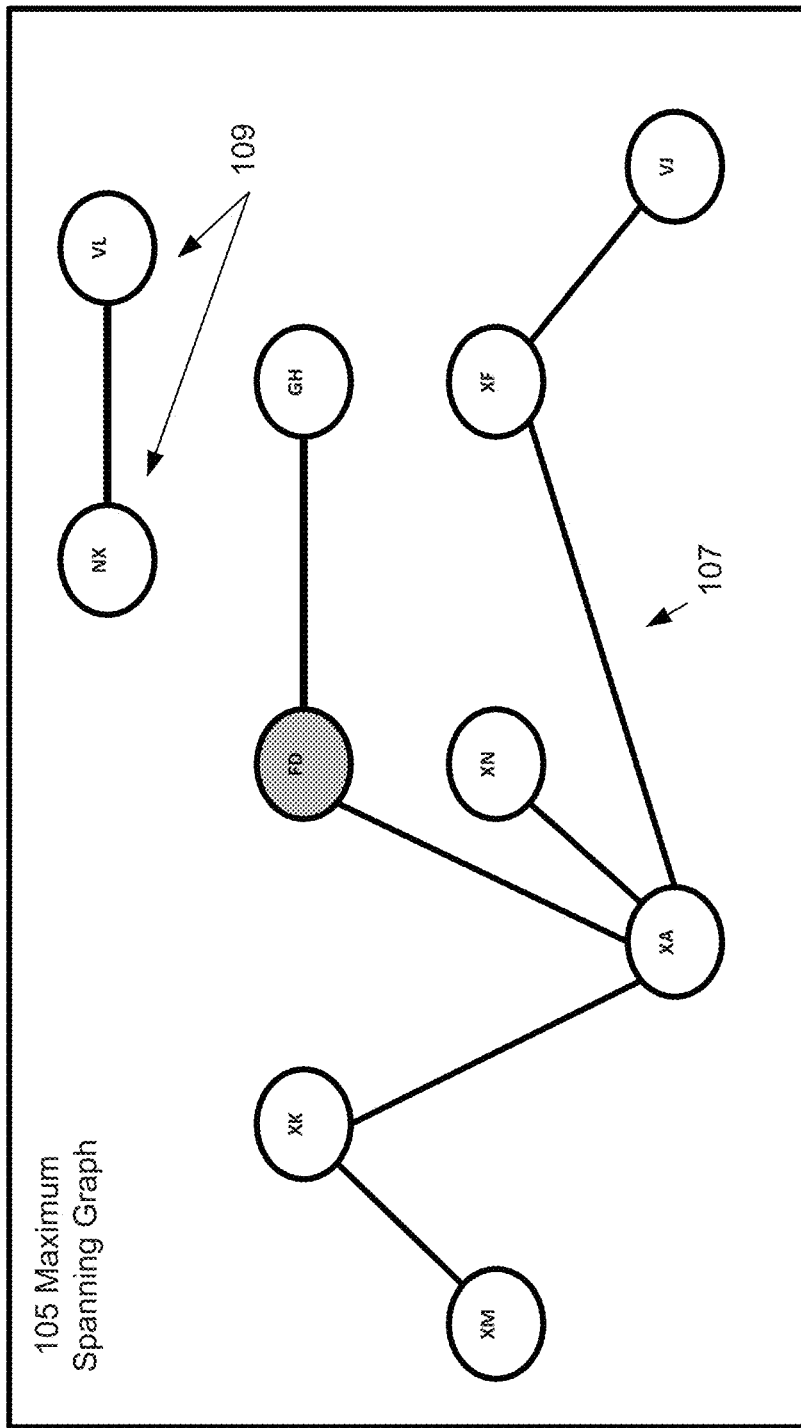
FIG. 11 depicts an example maximum spanning graph.

FIG. 11 depicts an example maximum spanning graph 105 after adding the last two composite objects that had a rank value greater than zero. As shown there are two disparate groups. The first group 107 includes the core object FD and base objects XK, XM, XA, XN, GH, XF, and VJ. The second group 109 includes the base objects NX and VL.

Due to the low quality of the connections to core object FD, the second group 109 NX and VL may not be priced from the core product FD. The composite object NX-GH appears to be not actively traded or transacted. The veracity of the composite object NX-GH is not verified by external sources. As such, the price of the composite object NX-GH may not be accurate and should not be used to price other objects. NX and VL may possibly be pricing used other methods or from a different core product.

As a comparison, the total revenue for the solutions/pricing routes for the maximum spanning graph 105 may be compared to the simple pricing complex as described above in FIG. 5. The total open interest for all the composite object in the simple pricing complex (FIG. 5) is 17,834. The total open interest for all the composite objects in the maximum spanning graph 105 is 34,380. The total revenue for all the composite object in the simple pricing complex is $447,290. The total revenue for all the composite objects in the maximum spanning graph 105 is $792,873. This comparison illustrates that maximum spanning graph 105 contains composite objects with both more open interest and revenue. The resulting solutions give more priorities to the composite objects have more OI and composite objects that generate more revenue e.g. more important composite objects/more liquid composite objects. A confidence value may be generated for each graph based on the total revenue or open interest or other market data. The confidence value may be used for comparison with previous confidence values or to evaluate the pricing solutions.

In certain embodiment, the resulting paths are aggregated with other paths from other sub-groups. For example, the second sub-group that was generated for the second core object TL.

Figure 12A:
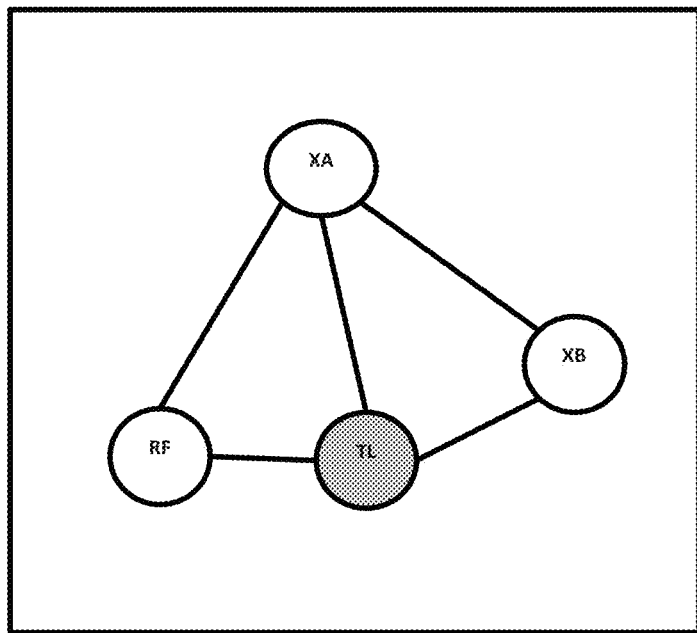
FIG. 12A and FIG. 12B depict a graph of and the maximum spanning tree for an example second sub-group of the product complex of FIG. 9.
Figure 12B:
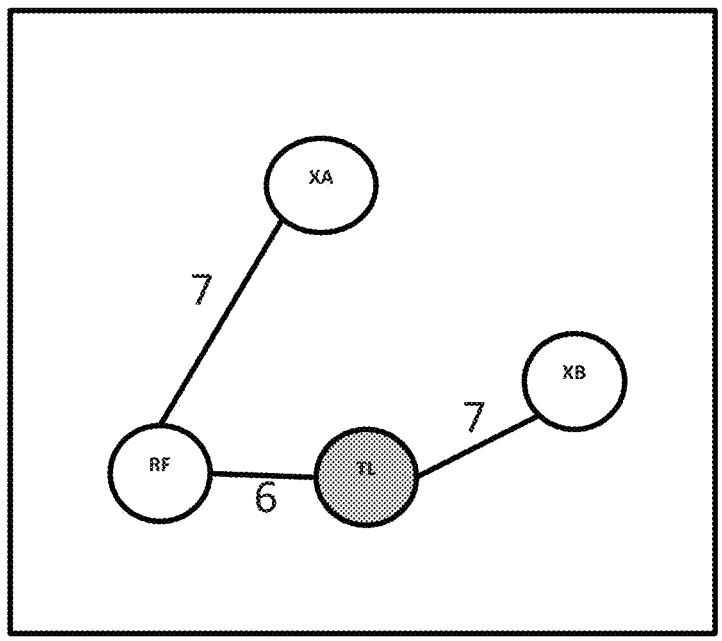

FIG. 12A and FIG. 12B depict a graph of and the maximum spanning tree for the second sub-group 95 of FIG. 9.

As shown in FIG. 12A, the second sub-group 95 includes the base objects XA, XB, RF, and TL and five composite objects (HB, FH, IP, IT and IX—described below in Table 9). Repeating steps A220-A240 for the second sub-group 95 generates a maximum spanning graph as shown in FIG. 12B. FIG. 12B further shows the rank values for each composite object in the graph.

The rank values for the composite objects may be calculated by using the following received data and the scoring mechanism used for the first sub group:

TABLE 9

| Composite Object | Leg 1 | Leg 2 | Revenue | open interest | # of broker marks | Rank value |
|---|---|---|---|---|---|---|
| HB | TL | XB | 64085 | 3654 | 4 | 6 |
| FH | TL | XA | 16302 | 1320 | 2 | 2 |
| IP | XB | XA | 105007 | 5354 | 3 | 7 |
| IT | XA | RF | 234613 | 8230 | 3 | 7 |
| IX | TL | RF | 92315 | 5020 | 3 | 6 |

From the maximum spanning tree the values for each of the base objects may be derived. For example, value for the base object XA may be calculated using the solution including the composite objects TL-RF and RF-XA. XA, however, also has a pricing path derived from the first sub group. The value for XA may be derived from the composite objects FD-XN and XN-XA. As XA was priced in both subgroups the exchange system needs to determine which solution should be used. In certain embodiments, the sum of revenue of the composite objects in each of the pricing paths may be divided by the number of composite objects to arrive at a value. The solution with the higher value may then be selected for use. For this example, the first sub-group's pricing solution for XA has a total revenue of 145,802. The sum divided by the number of composite objects is 72,901. For the second sub-group's pricing solution for XA, the total revenue is 326,928. The sum divided by the number of composite objects is 163,464. As such, the second sub-group's pricing solution has the higher value and may be selected for use.

At act A250, the exchange system calculates values for the one or more objects. As determined in the previous acts, the pricing solution for each base object in the product complex will be:

XM: XK-XA-FD
XK: XA-FD
XA: RF-TL
XN: XA-FD
XF: XA-FD
VJ: XF-XA-FD
GH: FD
RF: TL
XB: RL
NX: cannot price
VL: cannot price The values may be used to determine a mark to market amount on a daily basis during the term of the financial instrument. Such determinations may be made on a settlement date for the financial instrument for the purposes of final settlement.

Although some of the examples discussed herein relate to futures contracts and associated spread instruments, the disclosed embodiments for the optimization module may be applicable to options contracts, and in particular, to strike prices options contracts. For example, each options contract may include multiple strike prices, and an exchange system may receive multiple values for each strike price for an outright options contract. Moreover, even after the settlement module processes the received values, the exchange may have the choice of selecting one of multiple values for the strike prices for the options contracts. Thus, the optimization module may convert or translate each strike price for each options contract into a base object. The system may also convert spread instruments between strike prices into composite objects.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   identifying, by a processor coupled with a non-transitory memory, a set of base data objects and a set of composite data objects stored in the non-transitory memory, wherein each composite data object of the set of composite data objects includes two or more base data objects of the set of base data objects which contribute to a value as a whole of each composite data object of the set of composite data objects;
   identifying, by the processor, from the set of base data objects, a first core data object based on a level of confidence corroborated by a plurality of external sources;
   receiving, by the processor, data indicative of the level of confidence of the plurality of external sources in the value as a whole of each composite data object of the set of composite data objects and a number of the plurality of external sources;
   deriving, by the processor, a ranking value of each composite data object of the set of composite data objects based on the level of confidence and the number of the plurality of external sources;
   identifying, by the processor, a first plurality of composite data objects of the set of composite data objects, each of which including at least one of the two or more base data objects having an object relationship with the first core data object;
   storing, by the processor, in a first data structure, data indicative of the first plurality of composite data objects and, based on each of the object relationships thereof, the two or more base data objects, the first core data object, and the ranking value of each composite data object of the first plurality of composite data objects;
   generating, by the processor, a first subset of the data stored in the first data structure, the first subset of the data further indicative of only the object relationships therebetween having a highest ranking value; and
   determining, by the processor, based on the first subset of data, a value of the two or more base data objects.

2. The computer implemented method of claim 1, wherein each composite data object of the set of composite data objects comprises exchange offered spreads of the two or more base data objects.

3. The computer implemented method of claim 1, wherein the data indicative of the level of confidence is determined using revenue data for each composite data object of the set of composite data objects.

4. The computer implemented method of claim 1, wherein the data indicative of the level of confidence is determined using open interest data for each composite data object of the set of composite data objects.

5. The computer implemented method of claim 1, further comprising:
   excluding, by the processor from the first subset, one or more composite data objects with the ranking value below a threshold ranking value.

6. The computer implemented method of claim 1, further comprising:
   identifying, by the processor, from the set of base data objects and composite data objects, a second core data object;
   identifying, by the processor, a second plurality of composite data objects of the set of composite data objects, each of which including at least one of the two or more base data objects having an object relationship with the second core data object;
   storing, by the processor, in a second data structure, data indicative of the second plurality of composite data objects and, based on each of the object relationships thereof, the two or more base data objects, the second core data object, and the ranking value of each of the second plurality of composite data objects;
   generating, by the processor, a second subset of the data stored in the second data structure, the second subset of the data further indicative of only the object relationships therebetween having the highest ranking value;
   aggregating, by the processor, the first subset with the second subset; and
   determining, by the processor, the value of the two or more base data objects based on the aggregating.

7. The computer implemented method of claim 6, wherein the aggregating comprises:
   selecting a path having the highest ranking value of one or more paths in the first and second subsets.

8. The computer implemented method of claim 1, wherein the deriving of the ranking value comprises:
   calculating the ranking value using an equation $\alpha+\beta+$ broker marks, wherein $\alpha$ is a function of the data indicative of the level of confidence, wherein $\beta$ is a function of the number of the plurality of external sources.

9. The computer implemented method of claim 1, further comprising:
   receiving, by the processor, updated data indicative of the level of confidence for each of the first plurality of composite data objects; and
   deriving, by the processor, the ranking value for each of the first plurality of composite data objects as a function of the updated data indicative of the level of confidence.

10. A system comprising:
    a processor; and
    a non-transitory memory coupled with the processor via a network, the non-transitory memory storing computer executable instructions to cause the processor to:
      identify, a set of base data objects and composite data objects stored in the non-transitory memory, wherein each composite data object of the set of composite data objects includes two or more base data objects of the set of base data objects which contribute to a value as a whole of each composite data object of the set of composite data objects;
      identify, by the processor, from the set of base data objects, a first core data object based on a level of confidence corroborated by a plurality of external sources;
      receive, by the processor, data indicative of a level of confidence of the plurality of external sources in the value as a whole of each composite data object of the set of composite data objects and a number of the plurality of external sources;

derive a ranking value of each composite data object of the set of composite data objects based on the level of confidence and the number of the plurality of external sources;

identify a first plurality of composite data objects of the set of composite data objects, each of which including at least one of the two or more base data objects having an object relationship with the first core data object;

store, in a first data structure, data indicative of the first plurality of composite data objects and, based on each of the object relationships thereof, the two or more base data objects, the first core data object, and the ranking value of each composite data object of the first plurality of composite data objects;

generate a first subset of the data stored in the first data structure, the first subset of the data further indicative of only the object relationships therebetween having a highest ranking value; and determine, based on the first subset of data, a value of the two or more base data objects.

11. The system of claim 10, wherein each of the first plurality of composite data objects comprises exchange offered spreads of the two or more base data objects.

12. The system of claim 10, wherein the data indicative of the level of confidence is determined using revenue data for each composite data object of the set of composite data objects.

13. The system of claim 10, wherein the data indicative of the level of confidence is determined using open interest data for each composite data object of the set of composite data objects.

14. The system of claim 10, wherein the computer executable instructions further cause the processor to exclude, from the first data structure, one or more composite data objects with the ranking value below a threshold ranking value.

15. The system of claim 10, wherein the computer executable instructions further cause the processor to:

identify from the set of base data objects and composite data objects, a second core data object;

identify a second plurality of composite data objects of the set of composite data objects, each of which including at least one of the two or more base data objects having an object relationship with the second core data object;

store, in a second data structure, data indicative of the second plurality of composite data objects and, based on each of the object relationships thereof, the two or more base data objects, the second core data object, and the ranking value of each of the second plurality of composite data objects;

generate, a second subset of the data stored in the second data structure, the second subset of the data further indicative of only the object relationships therebetween having the highest ranking value;

aggregate the first subset with the second subset; and determine the value of the two or more base data objects based on the aggregation.

16. The system of claim 15, wherein the aggregation comprises selection of a path having the highest ranking value of one or more paths in the first and second subsets.

17. The system of claim 10, wherein the computer executable instructions further cause the processor to calculate the ranking value using an equation $\alpha+\beta+$broker marks, wherein $\alpha$ is a function of the data indicative of the level of confidence, wherein $\beta$ is a function of the number of the plurality of external sources.

18. The system of claim 10, wherein the computer executable instructions further cause the processor to generate a confidence value for the first subset.

19. The system of claim 10, wherein the computer executable instructions further cause the processor to:

receive updated data indicative of a level of confidence for each of the first plurality of composite data objects; and derive the ranking value for each of the first plurality of composite data objects as a function of the updated data indicative of the level of confidence.

20. A system comprising:

means for identifying a set of base data objects and composite data objects stored in a non-transitory memory, wherein each composite data object of the set of composite data objects includes two or more base data objects of the set of base data objects which contribute to a value as a whole of each composite data object of the set of composite data objects;

means for identifying, from the set of base data objects, a first core data object based on a level of confidence corroborated by a plurality of external sources;

means for receiving data indicative of the level of confidence of the plurality of external sources in the value as a whole of each composite data object of the set of composite data objects and a number of the plurality of external sources;

means for deriving a ranking value of each composite data object of the set of composite data objects based on the level of confidence and the number of the plurality of external sources;

means for identifying a first plurality of composite data objects of the set of composite data objects, each of which including at least one of the two or more base data objects having an object relationship with the first core data object;

means for storing in a first data structure, data indicative of the first plurality of composite data objects and, based on each of the object relationships thereof, the two or more base data objects, the first core data object, and the ranking value of each of the first plurality of composite data objects;

means for generating a first subset of the data stored in the first data structure, the first subset of the data further indicative of only the object relationships therebetween having a highest ranking value; and means for determining, based on the first subset of data, a value of the two or more base data objects.

* * * * *